UNITED STATES PATENT OFFICE.

EPHRAIM A. JONES AND JOHN A. JONES, OF MIDDLESBROUGH, ENGLAND.

IMPROVEMENT IN THE MANUFACTURE OF IRON AND STEEL.

Specification forming part of Letters Patent No. 171,024, dated December 14, 1875; application filed July 14, 1875.

*To all whom it may concern:*

Be it known that we, EPHRAIM ALLCOCK JONES and JOHN ALLCOCK JONES, both of Middlesbrough, in the county of York and Kingdom of England, have invented Improvements in the Manufacture of Iron and Steel, of which the following is a specification:

This invention has for its object the improving the quality and reducing the cost of converting pig-iron or metal into malleable iron or steel in rotary puddling-furnaces, or in other furnaces in which puddling is effected by mechanical means.

In carrying out this invention a partial reduction or removal is effected of some of the constituents of the pig-iron or metal in a cupola, or in any other furnace adapted for the purpose, by the use of oxides of iron, whether in the form of iron-ore, puddling-furnace cinder, hammer-slag, mill-tap cinder, and roll cinder or scale, or other known combinations, and also of scrap iron or steel, or in the furnace which is known as the refinery furnace. A portion of the carbon, silicon, and phosphorus, or a portion of any one of them, is thus eliminated from the cast iron or metal, and so rendering it easier of further conversion into malleable iron or steel in a rotary or other mechanical puddling-furnace, and thus saving much time, as well as fettling and coal.

From the cupola or other furnace, where the melting of the iron and the partial reduction or removal of the carbon, phosphorus, and silicon has been effected, we take the iron in a molten state to a rotary puddling-furnace, or to any furnace, whether rotary or not, in which puddling is done by mechanical means, and in such furnace we complete the reduction of the molten iron to malleable-iron or steel, as desired.

Having now described and particularly ascertained the nature of our said invention, and the manner in which the same is or may be used or carried into effect, we would observe, in conclusion, that we do not claim the partial reduction or removal of the carbon, silicon, and phosphorus, or a portion of any one of them, contained in the pig-iron or metal in a cupola or other furnace, such as a reverberatory furnace, by the use of oxides, or scrap iron or steel, or in that known as the ordinary refinery furnace, as hereinbefore described, which are processes known and understood; but

We claim—

The described improvements in the manufacture of iron or steel, which consist in first effecting the partial reduction or removal of the carbon, silicon, and phosphorus, or a portion of any one of them, contained in the pig iron or metal in a cupola or other furnace by the means herein set forth, and then effecting a further reduction or removal of a further portion of the carbon, silicon, and phosphorus contained in such metal in a rotary or mechanical furnace, the iron or metal from such cupola or other furnace being charged, in a molten state, into the rotary or other furnace where puddling is effected by mechanical means in such manner that iron or steel may be obtained.

In witness whereof we have signed our names to this specification in the presence of two subscribing witnesses.

E. A. JONES.
       J. A. JONES.

Witnesses:
 WILLIAM WARD,
  *Solicitor, Leeds.*
 GEO. BARKER,
  *Leeds, his clerk.*